Figure 1:
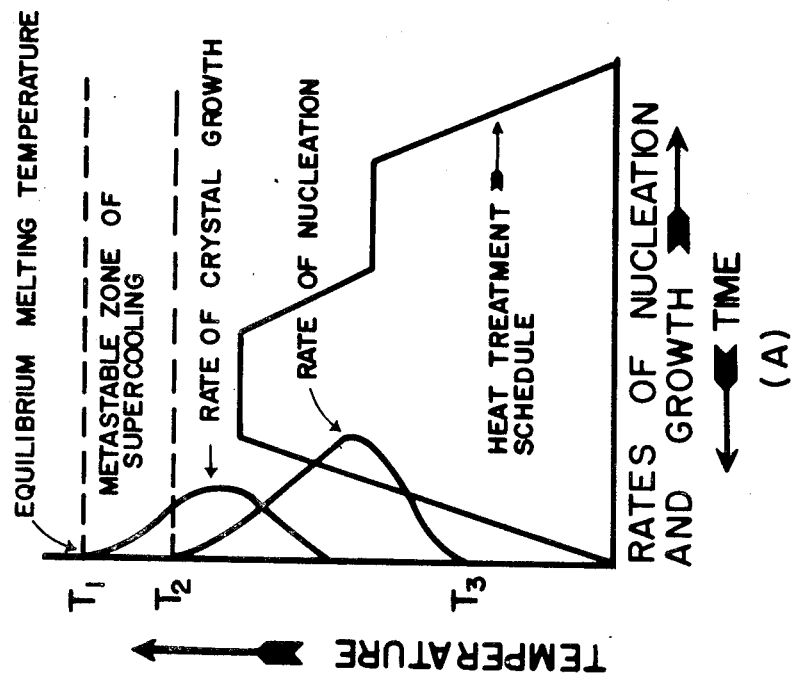

United States Patent [19]

Rittler

[11] 4,000,998

[45] Jan. 4, 1977

[54] SPONTANEOUSLY-FORMED NEPHELINE-CARNEGIEITE GLASS-CERAMICS

[75] Inventor: Hermann L. Rittler, Horseheads, N.Y.

[73] Assignee: Corning Glass Works, Corning, N.Y.

[22] Filed: Mar. 19, 1975

[21] Appl. No.: 559,730

[52] U.S. Cl. .................................. 65/33; 106/39.6
[51] Int. Cl.² .................... C03B 32/00; C03C 3/22
[58] Field of Search ............... 106/39.6, 39.7, 39.8; 65/33

[56] References Cited
UNITED STATES PATENTS

| | | | |
|---|---|---|---|
| 3,146,114 | 8/1964 | Kivlighn | 106/39.6 |
| 3,473,937 | 10/1969 | Tashiro | 106/39.7 |
| 3,573,073 | 3/1971 | Duke et al. | 106/39.6 |
| 3,720,526 | 3/1973 | Duke et al. | 106/39.6 |
| 3,790,430 | 2/1974 | Mochel | 106/39.6 |
| 3,804,608 | 4/1974 | Gaskell et al. | 106/39.7 |

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

The instant invention relates to the manufacture of articles demonstrating the physical properties and internal microstructure of glass-ceramic bodies but which can be formed spontaneously from molten glass. Thus, the heat treatment of a precursor glass body, such as is required in the production of conventional glass-ceramic articles to cause the crystallization in situ thereof, is avoided. More particularly, this invention relates to the manufacture of highly crystalline glass-ceramic articles having compositions within the $Na_2O$-$Al_2O_3$-$SiO_2$ field, wherein carnegieite and/or nepheline solid solution crystals constitute the predominant crystal phase, which can be formed spontaneously from a molten glass batch.

4 Claims, 3 Drawing Figures

SPONTANEOUSLY-FORMED NEPHELINE-CARNEGIEITE GLASS-CERAMICS

U.S. applications Ser. Nos. 559,725 and 559,787, filed concurrently herewith by David G. Grossman, and U.S. aplication Ser. No. 559,732, filed concurrently herewith by J. E. Flannery and D. R. Wexell, disclose the production of spontaneously formed glass-ceramic articles wherein a fluormica comprises the primary crystal phase. U.S. applications Ser. Nos. 559,726, 559,789, and 559,727, also filed concurrently herewith by David G. Grossman, disclose the production of spontaneously formed glass-ceramic articles wherein celsian, mullite, and beta-spodumene solid solution, respectively, constitutes the predominant crystal phase. U.S. application Ser. No. 559,786, filed concurrently herewith by George H. Beall, discloses the manufacture of spontaneously formed glass-ceramic articles wherein alpha-quartz solid solution constitutes the predominant crystal phase. U.S. application Ser. No. 559,788, also filed concurrently herewith by G. H. Beall, P. E. Balszyk, and W. T. Brydges, III, describes the manufacture of spontaneously formed glass-ceramic articles wherein beta-spodumene solid solution constitutes the principal crystal phase. Finally, U.S. Application Ser. No. 559,731, filed concurrently herewith by the present applicant, discusses the production of spontaneously formed glass-ceramic articles wherein BaO and/or SrO-$Fe_2O_3$-$SiO_2$ solid solution comprises the predominant crystal phase.

The foundation for the field of glass-ceramic technology is found in U.S. Pat. No. 2,920,971. As is explained therein, the manufacture of glass-ceramic articles is basically concerned with the controlled heat treatment of a parent or precursor glass body at elevated temperatures. In substance, the classic method for making glass-ceramic articles comprises three general steps. First, a glass-forming batch, which frequently contains a nucleating agent, is melted. Second, the molten batch is cooled to at least within and, more commonly, below the transformation range to yield an essentially crystal-free glass and, at the same time, an article of a desired configuration is shaped therefrom. Third, this glass shape is heated to a temperature above the transformation range thereof to cause the growth of crystals in situ. [The transformation range has been defined as that temperature at which a molten mass is converted into an amorphous solid, and has generally been deemed as lying in the vicinity of the annealing point of a glass.]

Most commonly, the third or crystallization process is undertaken in two steps. Hence, the parent glass body will first be heated to a temperature slightly above the transformation range and will be held at that temperature for a sufficient period of time to achieve substantial nucleation. Thereafter, the nucleated body is raised to a still higher temperature, commonly above the softening point of the precursor glass, and maintained at that temperature for a sufficient length of time to cause the development of crystals on the nuclei.

As a result of this carefully controlled heat treatment of the precursor glass body, a homogeneously crystallized article is produced wherein the crystals are relatively uniformly fine-grained. Nevertheless, for a more detailed discussion of the theoretical concepts and practical considerations involved in the structure and manufacture of glass-ceramic articles, reference is again made to U.S. Pat. No. 2,920,971, supra.

As molten glass-forming batches are cooled and formed into glass bodies, it has frequently been observed that crystallization will occur, the crystals initially being noted at the surface or at an interface between the melt and a forming element and then growing inwardly into the glass body. This phenomenon has been termed "normal" devitrification and is generally regarded as undesirable inasmuch as the resultant microstructure consists of non-uniformly sized, relatively coarse-grained crystals which are usually oriented in a plane perpendicular to the surface. This type of microstructure customarily leads to a mechanically weak body.

The mechanism of that crystallization process differs fundamentally from that present in the formation of glass-ceramic articles because it contemplates the growth of crystals at temperatures approaching or consonant with the liquidus of the molten glass. Another instance of crystallization taking place at or near the liquidus temperature is found in the fusion casting of refractory ceramic materials. In contrast to those processes, the production of glass-ceramic articles via the controlled heat treatment of parent glass bodies involves temperatures considerably below the liquidus, thereby providing a larger degree of supercooling, and thereby permitting the development of crystals in the glass at a much higher viscosity level. This circumstance allows time to play an important role in crystal growth.

The instant invention is principally concerned with the making of spontaneously-formed glass-ceramic articles. These articles exhibit physical properties and internal microstructures similar to those present in classic glass-ceramic articles. However, the articles produced by the instant invention can result from the simple cooling of a glass-forming melt of a particular composition. In other words, no specific heat treatment of a glass body is necessary to obtain the desired crystallization. Hence, certain compositions within the $Na_2O$-$Al_2O_3$-$SiO_2$ field, when cooled from a melt, will produce bodies consisting essentially of uniformly fine-grained crystals homogeneously dispersed within a glassy matrix. The final products will be highly crystalline, i.e., greater then 50% by volume crystalline, and the crystals, themselves, will have diameters less than about 5 microns with the majority being less than about 1 micron.

FIG. 1 graphicallly represents the differences in crystallization mechanism existing between the spontaneously formed glass-ceramic articles of the instant invention and conventional glass-ceramic articles. The most critical element is believed to be the overlap observed in the rate curves for nucleation and crystallization depicted therein. Hence, below the equilibrium melting temperature of the viscous liquid $T_1$, there can be seen a temperature range ($T_1$–$T_2$) wherein nuclei do not form at a perceptible rate. This temperature range has been termed the metastable zone of supercooling. WIth conventional glass-ceramic compositions no crystals develop at or just below the metastable zone because the nucleation rate within that range is so very slow that growth sites for crystals are not provided. Hence, nucleation takes place within the $T_2$–$T_3$ temperature interval.

The crystallization mechanism underlying the manufacture of classic glass-ceramic articles is illustrated in FIG. 1(A). As is shown there, crystallization is secured by first reheating the supercooled liquid, i.e., the parent glass article, into the region of maximum nucleation, maintaining that temperature for a period of time adequate to achieve the substantial development of nuclei, and subsequently raising the temperature of the nucleated body into the range of maximum growth and holding thereat for a sufficient period of time to obtain the desired crystal growth.

The crystallization mechanism prevailing in the production of the spontaneously formed glass-ceramic articles of the instant invention is graphically depicted in FIG. 1(B). It is quite evident that the metastable zone of supercooling is substantially narrower and the rates of nucleation and crystal growth much more rapid. These circumstances mean that nucleation and crystallization can take place at such a rapid rate immediately below the region of metastable supercooling that dwell periods of any substantial duration are not demanded. Therefore, the simple cooling of the melt will yield an article having uniformly fine-grained crystals homogeneously dispersed within a glassy matrix. It will be apparent, however, that extreme quenching of the molten batch could cool the mass at such a rapid rate through the respective ranges of nucleation and crystallization that the glass-ceramic body sought would not be produced.

U.S. Pat. No. 3,804,608 discloses a number of compositions which can be formed into glass-ceramic articles without employing the reheating step required in the production of conventional glass-ceramic articles, but no reference is made therein to compositions within the $Na_2O-Al_2O_3-SiO_2$ field of the instant invention wherein carnegieite and/or nepheline solid solution constitutes the predominant crystal phase.

Compositions operable in the present invention consist essentially, in weight percent on the oxide basis as calculated from the batch, of about 14–64% $Na_2O$, 8–50% $Al_2O_3$, and 26–65% $SiO_2$. In general, where the level of $Al_2O_3$ is below about 20%, the amount of $Na_2O$ will preferably be about 40%. Although their inclusion is not necessary, the addition of up to 10% $ZrO_2$ and/or up to 12% $P_2O_5$ has been found useful in modifying nucleation and crystal growth as well as the physical properties of the final product.

The thermal expansion coefficients over the range of room temperature (R.T.) to 300° C. range between about 80–218 × $10^{-7}$/° C. and the densities vary between about 2.590–2.652 g/cm $^3$. The physical appearance of the products run the gamut of white, blue, gray, brown, amber, to clear transparent. Numerous additions can be made to the base glass compositions, the total thereof being less than about 10%, to vary the visible or infrared transmittances (up to 2.5 microns) and, in some instances, resulting in fluorescence when excited by either short wave ultraviolet (2537 A) radiations or by cathode ray beam radiations. Such additions include: SnCl, CuO, KI, $Cu_2O$, ZnS, NiO, CdS, $WO_3$, $CeO_2$, $Sb_2O_3$, $FeCl_2$, $KMnO_4$, $TiO_2$, $Na_2SO_4$, $MnO_2$. NaF, $AlF_3$, LiF, $CaSO_4$, $V_2O_5$, $SnO_2$, Se, $K_2O$, starch, and $Li_2O$.

Examination of the crystalline product by means of X-ray diffraction analysis has shown the presence of carnegieite and/or nepheline solid solution as the predominant crystal phase. Where $ZrO_2$ is included in the batch composition in any substantial amount, zirconia crystals will be precipitated in the final product. Carnegieite is a crystal having the general formula $Na_2O\cdot Al_2O_3\cdot 2SiO_2$ with a defined geometry. Nepheline is a crystal having a structure classified in the hexagonal system and identified by the formula $(Na,K)AlSiO_4$. However, it has been pointed out by Donnay et al. that nepheline exists in a wide range of solid solutions, the extent of which is not fully brought out by the above formula (Paper No. 1309 of the Geophysical Laboratory entitled "Nepheline Solid Solutions").

Table I lists a group of glass compositions, expressed in weight percent on the oxide basis as calculated from the batch, useful in the instant invention. The actual batch ingredients for the base compositions can comprise any materials, either the oxide or other compounds, which, upon being melted together, will be converted into the desired oxide in the proper proportion. The $P_2O_5$ was included as $Al(PO_3)_3$. For convenience, the addition of the minor additives is reported in terms of the actual compounds used.

The batch constituents were ballmilled together to assist in securing a homogeneous melt and placed into a platinum crucible. After placing a platinum cover thereover, the crucible was inserted in an electrically fired furnace operating at about 1650° C. and maintained at that temperature for about six hours. The melt was fluid, demonstrating a viscosity of less than about 1000 poises at that temperature. Thereafter, the melt was poured into a graphite or steel mold to yield a slab about 6 × 6 × ½ inches. The slab was permitted to cool in the ambient environment to about 750°–850° C., as measured with an optical pyrometer, this cooling being accomplished in less than about two minutes. The slab was then transferred to an annealer operating at about 750°–850° C., depending upon the composition of the batch.

As the melt cools, the molten glass appears to stiffen in the customary manner until a temperature of about 1000° C., as determined by an optical pyrometer, is reached. At or somewhat below that temperature, a hazy opalization is observed at the surface of the slab and at the interface between the melt and the forming elements which quickly moves toward the center thereof. Crystal growth appears to begin almost directly thereafter. The presence of $P_2O_5$ is useful in alleviating possible warping or other adverse physical effects during the rapid crystallization.

This prior opalization has been found necessary to achieve the subsequent uniformly fine-grained crystallization which is desired. Hence, as has been illustrated in FIG. 1(B), there must be a very high degree of nucleation at temperatures at or about the optimum growth temperature to obtain fine-grained crystallization as the molten batch is cooled. This opalization, occurring at about 100°–300° C. above the annealing point of the glass, provides the necessary nucleation. However, whereas spontaneous opalization is observed in many glasses, unless one of the amorphous phases involved in the opalization is at least partially unstable as a glass and crystallites of some type are precipitated to function as nuclei, there will be no spontaneous crystallization of the major glass components. As noted above, the addition of $ZrO_2$ and $P_2O_5$ appear to be helpful in improving nucleation and crystal growth.

The mechanism underlying the extremely rapid and spontaneous growth of cranegieite-nepheline solid solution crystals is not fully comprehended. Nevertheless, it is believed that crystallites are developed at temperatures well above the annealing point of the glass during or immediately after the opalization reaction which supply available nuclei while the glass is still within the temperature range of maximum crystal growth

TABLE I

|  | 1 | 2 | 3 | 4 | 5 | 6 | 7 | 8 | 9 | 10 |
|---|---|---|---|---|---|---|---|---|---|---|
| $SiO_2$ | 41.5 | 40.0 | 37.7 | 47.1 | 32.7 | 40.7 | 35.8 | 34.0 | 37.8 | 35.2 |
| $Al_2O_3$ | 35.8 | 35.5 | 37.7 | 30.2 | 45.5 | 35.2 | 21.1 | 24.2 | 22.2 | 8.3 |
| $Na_2O$ | 17.0 | 16.4 | 18.9 | 17.0 | 12.7 | 16.7 | 37.9 | 36.0 | 40.0 | 43.2 |
| $ZrO_2$ | 5.7 | 9.1 | 5.7 | 5.7 | 9.1 | 7.4 | 5.2 | — | — | 4.0 |
| $P_2O_5$ | — | — | — | — | — | — | — | 5.8 | — | 9.3 |

|  | 11 | 12 | 13 | 14 | 15 | 16 | 17 | 18 | 19 | 20 |
|---|---|---|---|---|---|---|---|---|---|---|
| $SiO_2$ | 28.8 | 28.8 | 28.8 | 24.0 | 38.1 | 38.1 | 38.1 | 38.1 | 38.1 | 38.1 |
| $Al_2O_3$ | 14.7 | 19.5 | 30.7 | 22.7 | 23.0 | 23.0 | 23.0 | 23.0 | 23.0 | 23.0 |
| $Na_2O$ | 43.2 | 38.4 | 27.2 | 40.0 | 28.6 | 28.6 | 28.6 | 28.6 | 28.6 | 28.6 |
| $ZrO_2$ | 4.0 | 4.0 | 4.0 | 4.0 | — | — | — | — | — | — |
| $P_2O_5$ | 9.3 | 9.3 | 9.3 | 9.3 | 5.5 | — | — | — | — | — |
| $MnO_2$ | — | — | — | — | 4.8 | — | — | — | — | — |
| $TiO_2$ | — | — | — | — | — | — | — | — | — | — |
| $FeCl_2$ | — | — | — | — | — | — | — | — | — | — |
| $NaF$ | — | — | — | — | — | — | — | — | — | — |
| $NaI$ | — | — | — | — | — | — | — | — | — | — |
| $Na_2SO_4$ | — | — | — | — | — | — | — | — | — | — |

|  | 21 | 22 | 23 | 24 | 25 | 26 | 27 | 28 | 29 | 30 |
|---|---|---|---|---|---|---|---|---|---|---|
| $SiO_2$ | 38.1 | 38.1 | 38.1 | 38.1 | 38.1 | 38.1 | 38.1 | 38.1 | 38.1 | 36.4 |
| $Al_2O_3$ | 23.0 | 23.0 | 23.0 | 23.0 | 23.0 | 23.0 | 23.0 | 23.0 | 23.0 | 22.0 |
| $Na_2O$ | 28.6 | 28.6 | 28.6 | 28.6 | 28.6 | 28.6 | 28.6 | 28.6 | 28.6 | 27.3 |
| $P_2O_5$ | 5.5 | 5.5 | 5.5 | 5.5 | 5.5 | 5.5 | 5.5 | 5.5 | 5.5 | 5.3 |
| $Na_2SO_3$ | 4.8 | — | — | — | — | — | — | — | — | — |
| $KMnO_4$ | — | — | — | — | — | — | — | — | — | — |
| $AlF_3$ | — | — | — | — | — | — | — | — | — | — |
| $Sb_2O_3$ | — | — | — | — | — | — | — | — | — | — |
| $BaO$ | — | — | — | — | — | — | — | — | — | — |
| $Ce(OH)_4$ | — | — | — | — | — | — | — | — | — | — |
| $WO_3$ | — | — | — | — | — | — | — | — | — | — |
| $V_2O_5$ | — | — | — | — | — | — | — | — | — | — |
| $LiF$ | — | — | — | — | — | — | — | — | — | — |
| $CaSO_4$ | — | — | — | — | — | — | — | — | — | — |

|  | 31 | 32 | 33 | 34 | 35 | 36 | 37 | 38 |
|---|---|---|---|---|---|---|---|---|
| $SiO_2$ | 33.3 | 29.2 | 45.7 | 45.3 | 50.0 | 54.2 | 50.0 | 35.5 |
| $Al_2O_3$ | 15.3 | 23.6 | 11.4 | 11.3 | 10.3 | 10.3 | 18.7 | 30.1 |
| $Na_2O$ | 41.7 | 37.5 | 38.1 | 37.7 | 30.0 | 25.8 | 21.6 | 9.7 |
| $P_2O_5$ | 9.7 | 9.7 | — | — | 9.7 | 9.7 | 9.7 | — |
| $ZnS$ | — | — | — | — | — | — | — | — |
| $KI$ | — | — | — | — | — | — | — | — |
| $Se$ | — | — | — | 1.0 | — | — | — | — |
| $BaO$ | — | — | — | — | — | — | — | — |

Table II comprises a summary of the visual appearance, the internal microstructure, the crystal phases present as determined through X-ray diffraction analysis, the coefficient of thermal expansion ($\times 10^{-7}/°$ C.) as measured over the range of R.T. to 300° C., the density (g/cc), the infrared transmittance measured at a wavelength of 2.5 microns through 4 mm. thick polished sections, fluorescence under ultraviolet (UV) radiation (2537 A), and cathodoluminescence when subjected to a beam of cathode rays. The coefficient of thermal expansion and the density were determined in accordance with standard measuring techniques. Where two or more crystal phases were identified, they are reported in the order of the amount present, the most prevalent phase being listed first.

Figure 2:
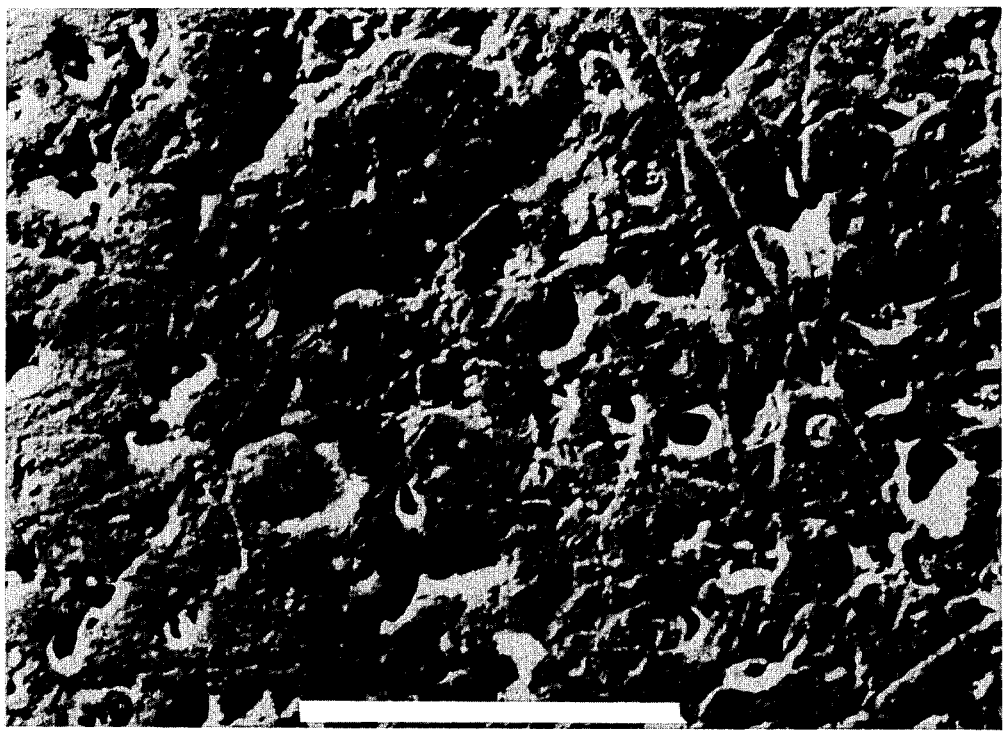
Figure 3:
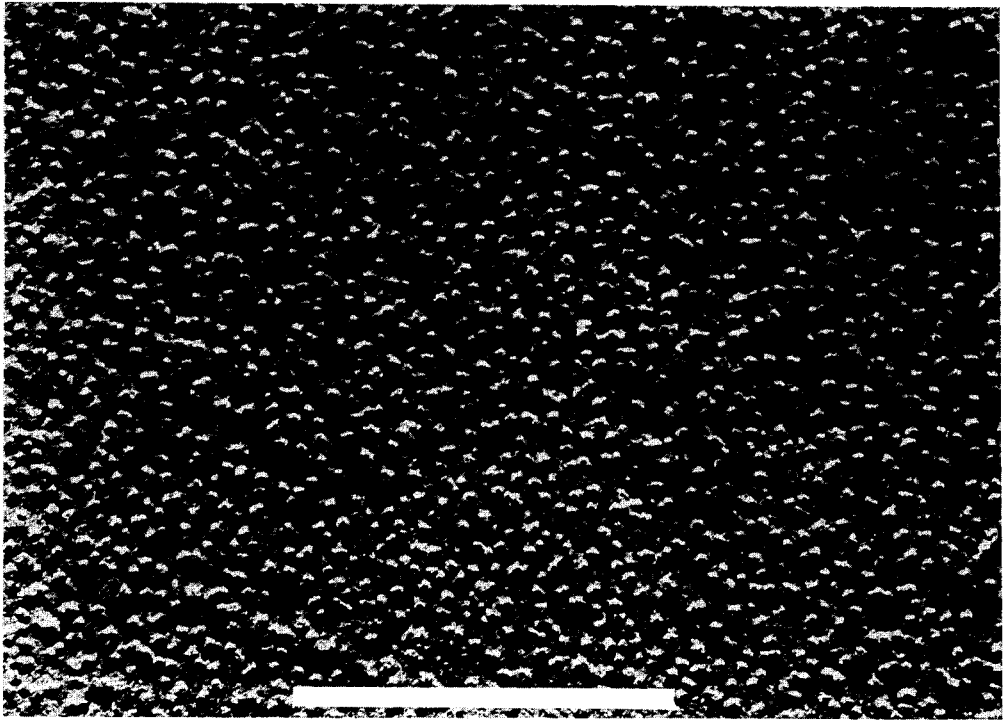

FIGS. 2 and 3, replica electron micrographs of the spontaneously formed slabs of Examples 8 and 9, respectively, are illustrative of the characteristic microstructure of the desired highly crystalline products. The white bar at the base of the photograph represents a distance of one micron. As can readily be seen, the crystals have diameters of less than one micron and the total crystallinity far exceeds 50% by volume. Example 8 produced a white, opaque body whereas Example 9 was transparent with an amber hue.

TABLE II

| Example No. | Visual Appearance | Microstructure | Crystal Phases | Coef. Exp. | Density | Transmittance and Fluorescence |
|---|---|---|---|---|---|---|
| 1 | Gray opaque | Very fine-grained | — | — | — | — |
| 2 | White opaque | '' | — | — | — | — |
| 3 | White opaque | '' | — | 165.7 | 2.631 | — |
| 4 | Blue gray | '' | — | 83.7 | 2.595 | — |
| 5 | White opaque | '' | — | 113.0 | 2.561 | — |
| 6 | White opaque | '' | — | 161.8 | 2.626 | — |
| 7 | Amber transparent | '' | Carnegieite, nepheline, zirconia | — | — | — |
| 8 | White opaque | '' | Carnegieite, nepheline | — | — | — |
| 9 | Amber transparent | '' | Nepheline, carnegieite | — | — | — |
| 10 | Hazy transparent | '' | Nepheline, carnegieite | — | — | — |
| 11 | Blue-gray opaque | '' | Carnegieite | 212 | 2.630 | — |
| 12 | Blue-gray opaque | Very fine-grained | Carnegieite | 212 | 2.612 | — |
| 13 | White opaque | '' | — | — | — | — |

TABLE II-continued

| Example No. | Visual Appearance | Microstructure | Crystal Phases | Coef. Exp. | Density | Transmittance and Fluorescence |
|---|---|---|---|---|---|---|
| 14 | Brown opaque | '' | Carnegieite | — | — | |
| 15 | Black opaque | '' | '' | 208 | — | Trans. at 2.5 microns 87%/4 mm. |
| 16 | White opaque | '' | Carnegieite, nepheline | — | — | — |
| 17 | Light Green transparent | '' | '' | — | — | |
| 18 | Transparent | '' | '' | 117.6 | — | Trans. at 2.5 microns 85%/4 mm. |
| 19 | Gray transparent | '' | '' | — | — | Trans. at 2.5 micron 81%/4 mm. |
| 20 | '' | '' | '' | — | — | Trans. at 2.5 microns 70%/4 mm. |
| 21 | '' | '' | '' | — | — | Trans. at 2.5 microns 76%/4 mm. |
| 22 | Lavendar opaque | '' | Carnegieite | — | — | Trans. at 2.5 microns 90%/4 mm. |
| 23 | Hazy transparent | Very fine-grained | Nepheline, carnegieite | — | — | Trans. at 2.5 microns 87%/4 mm. |
| 24 | Brown opaque | '' | '' | — | — | 0%/4 mm. |
| 25 | Brown opaque | '' | '' | — | — | 0%/4 mm. |
| 26 | Gray amber transparent | '' | '' | — | — | Trans. at 2.5 microns 90%/4 mm. |
| 27 | Gray transparent | '' | carnegieite | — | — | Trans. at 2.5 microns 19%/4 mm. |
| 28 | Brown opaque | '' | '' | — | — | Lilac UV fluorescence |
| 29 | Gray opaque | '' | '' | — | — | — |
| 30 | Gray opaque | '' | — | — | — | UV fluorescence |
| 31 | Gray opaque | '' | — | — | — | '' |
| 32 | White opaque | '' | — | — | — | UV fluorescence white cathodoluminescence |
| 33 | Brown pink opaque | '' | — | — | — | Lilac UV fluorescence pink cathodoluminescence |
| 34 | Transparent | Very fine-grained | — | — | — | Blue UV fluorescence blue cathodoluminescence |
| 35 | Gray brown opaque | '' | — | — | — | Lilac UV fluorescence white cathodoluminescence |
| 36 | Gray opaque | '' | — | — | — | '' |
| 37 | Gray opaque | '' | — | — | — | UV fluorescence |
| 38 | White opaque | '' | — | — | — | '' |

It is believed apparent from the above description that the process of the instant invention involves four fundamental steps. First, a glass-forming batch having a composition within the operable ranges outlined above is melted. Second, the molten batch is simultaneously cooled at a rate between about 10°–1000° C./minute to a temperature about 100°–300° C. above the annealing point of the glass to secure phase separation and nucleation and a glass body shaped therefrom. Third, the glass body is exposed to a temperature between the annealing point of the glass and the temperature of phase separation and nucleation for a period of time sufficient to cause crystallization of the desired cargneieite and/or nepheline solid solution. Fourth, the crystallized body is cooled to room temperature.

As has been explained previously, the occurrence of a phase separation with accompanying nucleation is of critical significance to the operability of the invention. Hence, the rate of cooling the molten batch ought not to be so rapid that sufficient time is not provided for the demanded phase separation and nucleation to occur. Laboratory experience has demonstrated that, with the compositions of the instant invention, cooling rates between about 10°–1000° C./minute assure satisfactory phase separation and nucleation. These events normally take place at temperatures between about 850°–1050° C.

Inasmuch as the compositions of this invention crystallize rapidly after the phase separation and nucleation have taken place, exposure times as brief as about 2 minutes within the crystallization range may be adequate to secure high crystallinity, i.e., greater than 50% by volume of the body. Crystallization has commonly been observed to occur at temperatures between about 650°–850° C. However, as was illustrated above, ease in production has recommended that the glass body which has been phase separated and nucleated be placed into an annealer operating at a temperature within or slightly above the crystallization range. Annealing techniques which are standard in the glass-making art can also be successfully employed here. Thus, annealing times as short as 0.5 hour can be sufficient with certain compositions, but the more common practice involves periods of two hours or more. However, the utilization of very long annealing schedules does not appear to substantially improve the internal microstructure or physical properties of the final product.

Although the preferred practice of the invention contemplates crystallizing the article directly from the phase separated and nucleated glass body as it is cooled to room temperature, it is possible to cool the melt to room temperature at a rate so rapid that phase separation and nucleation will take place but the desired fine-grained crystallization will not occur, such that the final body is essentially glassy. However, crystallization of that glassy body can be achieved by exposing it to a temperature within the crystallization range in like manner to that described above with respect to the crystallization obtained as the melt is cooled to room temperature. Thus, as has been emphasized previously, it is the occurrence of phase separation and nucleation at temperatures above the crystallization range which is of critical importance to the operability of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz, exposing the crystallized article to a blast of cold air to chill it to room temperature, is the preferred technique due to ease of practice and relative low cost, but immersion in various liquids such as oils and salt baths can also be operable.

The mechanism working to provide this enhancement in mechanical strength is not fully comprehended, but is believed to involve the small amount of residual glass which is thought to be present as a continuous phase throughout the crystallized body. This belief is deemed to be supported through an examination of FIG. 2 wherein the residual glass is seen as pockets and in FIG. 3 wherein residual glass surrounds the small crystallites.

I claim:
1. A method for making a highly crystalline glass-ceramic article consisting essentially of carnegieite and/or nepheline solid solution dispersed within a glassy matrix, said crystals comprising at least 50% by volume of said article, which comprises the steps of:
   a. melting a batch for a glass consisting essentially, by weight on the oxide basis, of about 14–64% $Na_2O$, 8–50% $Al_2O_3$, and 26–65% $SiO_2$;
   b. simultaneously cooling said melt at a rate between about 10°–1000° C./minute to a temperature about 850°–1050° C. to shape said melt into a glass body and obtain a phase separation and nucleation therein;
   c. further cooling said shaped glass body and exposing said glass body to a temperature between about 650°–850° C. for a sufficient length of time to cause crystallization of the carnegieite and/or nepheline solid solution crystals in said glass body; and then
   d. cooling the crystallized body to room temperature.
2. A method according to claim 1 wherein said time sufficient to cause crystalliztion is at least about 2 minutes.
3. A method according to claim 1 wherein said glass also contains up to about 10% $ZrO_2$ and/or up to about 12% $P_2O_5$.
4. A method according to claim 1 wherein said crystallized body is cooled to room temperature by means of a quick chilling technique to thermally temper said body.

* * * * *

UNITED STATES PATENT AND TRADEMARK OFFICE
CERTIFICATE OF CORRECTION

PATENT NO. : 4,000,998
DATED : January 4, 1977
INVENTOR(S) : Hermann L. Rittler

It is certified that error appears in the above-identified patent and that said Letters Patent are hereby corrected as shown below:

Column 1, line 62, "homogeneously crystal-" should be -- homogeneously-crystal- --.

Column 2, line 50, "ously formed" should be -- ously-formed --.

Column 3, line 9, "spontaneously formed" should be -- spontaneously-formed --.

Column 4, lines 20-21, "electrically fired" should be -- electrically-fired --.

Column 4, line 62, "cranegieite" should be -- carnegieite --.

Columns 5 and 6, Table I, constituent "$P_2O_5$", Examples 16, 17, 18, 19, and 20, insert -- 5.5 --.

Columns 5 and 6, Table I, constituent "$TiO_2$", Example 16, insert -- 4.8 --.

Columns 5 and 6, Table I, constituent "$FeCl_2$", Example 17, insert -- 4.8 --.

Columns 5 and 6, Table I, constituent "NaF", Example 18, insert -- 4.8 --.

Columns 5 and 6, Table I, constituent "NaI", Example 19, insert -- 4.8 --.

Columns 5 and 6, Table I, constituent "$Na_2SO_4$", Example 20, insert -- 4.8 --.

Columns 5 and 6, Table I, constituent "$KMnO_4$", Example 22, insert -- 4.8 --.

Columns 5 and 6, Table I, constituent "$AlF_3$", Example 23, insert -- 4.8 --.

Columns 5 and 6, Table I, constituent "$Sb_2O_3$", Example 24, insert -- 4.8 --.

Columns 5 and 6, Table I, constituent "BaO", Example 25, insert -- 4.8 --

Columns 5 and 6, Table I, constituent "$Ce(OH)_4$", Example 26, insert -- 4.8 --.

Columns 5 and 6, Table I, constituent "$WO_3$", Example 27, insert -- 4.8 --.

Columns 5 and 6, Table I, constituent "$V_2O_5$", Example 28, insert -- 4.8 --.

Columns 5 and 6, Table I, constituent "LiF", Example 29, insert -- 4.8 --.

Columns 5 and 6, Table I, constituent "$CaSO_4$", Example 30, insert -- 9.0 --.

UNITED STATES PATENT AND TRADEMARK OFFICE
CERTIFICATE OF CORRECTION

PATENT NO. : 4,000,998
DATED : January 4, 1977
INVENTOR(S) : Hermann L. Rittler

It is certified that error appears in the above-identified patent and that said Letters Patent are hereby corrected as shown below:

Columns 5 and 6, Table I, constituent "ZnS", Example 33, insert -- 4.8 --.

Columns 5 and 6, Table I, constituent "KI", Example 34, insert -- 4.7 --.

Columns 5 and 6, Table I, constituent "BaO", Example 38, insert -- 24.7 --.

Columns 5 and 6, Table II, Example No. 2, under column heading "Coef. Exp.", insert -- 129.6 --.

Columns 5 and 6, Table II, Example No. 2, under column heading "Density", insert -- 2.652 --.

Columns 5 and 6, Table II, Example No. 10, under column heading "Coef. Exp.", insert -- 195.1 --.

Columns 5 and 6, Table II, Example No. 10, under column heading "Density", insert -- 2.590 --.

Columns 5 and 6, Table II, Example No. 12, under column heading "Coef. Exp.", "212" should be -- 218 --.

Columns 7 and 8, Table II continued, Example No. 17, under column heading "Coef. Exp.", insert -- 80.7 --.

Columns 7 and 8, Table II continued, Example No. 30, under column heading "Transmittance and Fluorescence", "UV fluorescence" should be -- Lilac UV fluorescence --.

Columns 7 and 8, Table II continued, Example No. 32, under column heading "Transmittance and Fluorescence", "UV fluorescence" should be -- Lilac UV fluorescence --.

Columns 7 and 8, Table II continued, Example No. 37, under column heading "Transmittance and Fluorescence", "UV fluorescence" should be -- Lilac UV fluorescence --.

Signed and Sealed this

Twenty-sixth Day of April 1977

[SEAL]

Attest:

RUTH C. MASON
Attesting Officer

C. MARSHALL DANN
Commissioner of Patents and Trademarks